United States Patent
Patry et al.

[11] Patent Number: 5,853,045
[45] Date of Patent: Dec. 29, 1998

[54] ACCUMULATOR-EXCHANGER DEVICE

[76] Inventors: Jean Patry, 9, rue Saint-Paul, 75004 Paris; Claude Reboul, 86, rue Michel-Ange, F-75016 Paris, both of France

[21] Appl. No.: 930,007
[22] PCT Filed: Mar. 25, 1996
[86] PCT No.: PCT/FR96/00444
  § 371 Date: Sep. 29, 1997
  § 102(e) Date: Sep. 29, 1997
[87] PCT Pub. No.: WO96/30710
  PCT Pub. Date: Oct. 3, 1996

[30] Foreign Application Priority Data

Mar. 31, 1995 [FR] France ................... 95 03849

[51] Int. Cl.⁶ ............................... F28D 17/00
[52] U.S. Cl. ............................. 165/10; 257/70
[58] Field of Search .................... 165/10; 252/70

[56] References Cited

U.S. PATENT DOCUMENTS

| | | | |
|---|---|---|---|
| 4,446,916 | 5/1984 | Hayes | 165/10 X |
| 4,509,584 | 4/1985 | Michalak et al. | 165/10 X |
| 4,565,242 | 1/1986 | Yano et al. | 165/10 |
| 4,681,154 | 7/1987 | Yano et al. | 165/10 |
| 4,768,579 | 9/1988 | Patry | 165/10 |

FOREIGN PATENT DOCUMENTS 3005450  8/1981  Germany ................... 165/10

*Primary Examiner*—Ira S. Lazaros
*Assistant Examiner*—Christopher Atkinson

[57] ABSTRACT

An accumulator-exchanger of the filling-body type, the rigid spherical shells of which are partially filled with a heat and/or cold storage agent having a high liquid-solid transformation latent heat, such as water, salt hydrates or paraffins, and with a compressible material for absorbing the variations in the volume of the storage agent during its phase change. Projections for increasing the exchange surface area consist of raised features inscribed on the shells of the filling bodies, which raised features all have an axis of symmetry passing through the center of symmetry of their base and through the center of the filling body. The bases of the raised features are all equal and identical and the raised features are uniformly distributed over the entire surface of the shell.

16 Claims, 4 Drawing Sheets

ACCUMULATOR-EXCHANGER DEVICE

FIELD OF THE INVENTION

The present invention relates to a heat and/or cold accumulator-exchanger device intended to receive a storage agent having a high liquid-solid transformation latent heat, in particular water, of the filling-body type.

BACKGROUND OF THE INVENTION

Plants are known which require the means of producing heat or cold in variable amounts during a given period, these plants being designed so as to reduce, to a significant extents the power of the equipment intended to produce the heat and/or cold. An example of such plants is given in French Patent FR-A-2,469,678.

Such plants always include heat and/or cold accumulator-exchangers. Some of these accumulator-exchangers, called filling-body accumulator-exchangers, consist of a storage tank which itself contains filling bodies in which the heat and/or cold is stored in offpeak periods and then redistributed in peak periods using a liquid heat-transfer medium (water, glycol solution, etc.) which carries out exchange by flowing through the tank between the filling bodies. The filling bodies of these accumulator-exchangers generally contain a material having a high liquid-solid transformation latent heat (water, salt hydrates, paraffins, etc.) which is encapsulated in a shell of very generally spherical shape, this shape being preferred because of its symmetry properties, of its ease of implementation in storage tanks, and of the uniform flow of the heat-transfer medium responsible for the heat transfer which it provides. Examples of such plants are given in U.S. Pat. No. 2,525,261, French Patent FR-A-2,244,969 or European Patent EP-A-076,884.

Many filling bodies intended for these accumulator-exchangers of known type which make it possible, in addition to storing a large amount of heat and/or cold in a restricted volume, to absorb without any damage the variations in volume which result from the liquid-solid phase change of the high transformation-latent-heat materials contained in the shells of such bodies, are known. These are:

filling bodies, preferably completely filled with the storage agent, which possess a flexible structure, such as those described in U.S. Pat. No. 2,525,261 or European Patent EP-A-0,277,847;

filling bodies, preferably completely filled with the storage agent, which possess an elastic structure, such as those described in French Patent FR-A-1,104,400; and filling bodies partially filled with the storage agent, which possess a deformable structure and a pocket of air or a compressible material introduced into the filling body, such as those described in German Patent DE 30 05 450 A1 or European Patent EP-A-076,884.

The technique used for making the filling bodies introduced into accumulator-exchangers, which consists in manufacturing a plastic shell, in filling it with the storage material in the liquid state and then in closing it in a sealed manner, is known. All the shells of the filling bodies are made of plastic since other materials (in particular metals) lead to excessive manufacturing costs. Because of the large quantities of filling bodies necessary, these shells are manufactured in high volume using the technique of extrusion-blow moulding since this technique gives lower manufacturing costs than other known techniques, such as injection moulding or injection-blow moulding. The technique of extrusion-blow moulding is a very widely used technique; it consists in projecting, by blowing compressed air, an extruded tube of softened plastic into the cavity of a mould whose geometrical shape has the shape of the body which it is desired to obtain. During cooling of the mould, the plastic deposited on the internal wall of the latter cools and then hardens, and the mould is then opened so as to release the moulded body. However, this technology, which is intrinsically simple, is relatively restrictive and limiting in the choice of the shapes which it allows; this is because, on the one hand, all parts of the mould must necessarily be seen directly from the plastic tube, with the risk that concealed parts do not receive material during blowing, the back-tapers must be minimal so that the components can be unmolded without damaging them.

It is also well-known that the thermodynamic properties of an accumulator-exchanger are determined by the capacity for exchange obtained between the storage material and the heat-transfer fluid; when the accumulator-exchanger is of the filling-body type, it is known that the capacity for exchange with the heat-transfer fluid is greater:

1—the thinner the filling-body shells;
2—the greater the surface area of the filling-body shells;
3—the greater the convection coefficient which governs the exchange between the shells and the heat-transfer fluid; and
4—the greater the thermal conductivity coefficient of the filling-body shells.

The objective of the present invention therefore consists in producing a heat and/or cold accumulator-exchanger of the filling-body type, these filling bodies containing a storage agent having a high liquid-solid transformation latent heat, which combines optimum mechanical properties and thermodynamic properties but which at the same time takes into account the technological manufacturing constraints and the economic constraints of the market.

The characteristics which influence the various factors on which the capacity for exchange with the heat-transfer fluid of an accumulator-exchanger depends will be examined below.

1—Optimization of the thickness of the filling-body shells of the accumulator-exchanger.

The filling bodies of an accumulator-exchanger must have excellent mechanical strength in order to withstand being loaded loosely in the storage tank without being damaged and in order to withstand the internal mechanical stresses due to the expansion of the high transformation latent-heat material during its phase change. In order to achieve this objective, it might be regarded as sufficient to increase the thickness of the wall of the shell of the filling bodies sufficiently in order to give them sufficient mechanical strength. This would be to ignore the fact that the manufacturing cost of the filling bodies increases with the weight of plastic used to manufacture the shell of these bodies and the fact that the exchange capacity decreases when the thickness of the shell increases. Therefore the technico-economic objective for producing the filling-body shell consists in using a minimum weight and thickness of plastic which makes it possible, however, to ensure that the shell has a mechanical strength tailored to the stresses to which it is subjected. On this account, the shape of the shell of the filling bodies, which are to contain the change-of-phase material, most widely used by far is that of a sphere, since the latter exhibits good resistance to the stresses and particularly to the internal radial stresses which develop during expansion of the change-of-phase material. This is because, when the shell is spherical, the stresses associated with expansion of the change-of-phase material are radial and isotropic and are therefore exerted uniformly and with the same (radial) orientation over the entire surface of the shell, and it is under these conditions that the optimum value for the weight of the plastic used for producing the filling body is obtained since it then corresponds to a shell of minimum thickness, this thickness being constant over its entire surface.

The production of a simple spherical shell, of minimum, constant and uniform thickness, for producing the filling bodies of an accumulator-exchanger of the filling-body type is not claimed here.

2—Optimization of the surface area of the filling-body shells of the accumulator-exchanger.

It is known that the filling factor of the storage tank of an accumulator-exchanger of the filling-body type using spherical filling bodies is independent of the diameter of the filling bodies deposited in the tank of the accumulator-exchanger, but that the exchange surface area increases when the diameter of the filling bodies decreases. It is therefore theoretically possible, using very many filling bodies of very small diameter to obtain very high exchange surface areas. However, this solution should not be adopted as it would be to ignore the fact that the production costs, which are directly related to the filling-body production rates, in fact increase much more rapidly than the exchange surface area when the diameter of the filling bodies decreases.

Thus, for example:

1 kWh of energy could be stored in an accumulator-exchanger consisting of a main tank having a volume of 17 litres filled with (a) 20 spherical bodies having a diameter of 100 mm, which have an exchange surface area of 0.62 $m^2$ and which could be produced in large volume for a reference cost of 1 FF per unit or 20 FF/kWh stored, or (b) 160 spherical bodies having a diameter of 50 mm, which have an exchange surface area of 1.24 $m^2$ and which could be produced in large volume at 65% of the reference cost of the unit, i.e. 0.65 FF per unit or 104 FF/kWh.

This example clearly shows that, in order to double the surface area (i.e. the capacity) for exchange of the spherical filling bodies of the accumulator-exchanger, it is necessary to multiply the number of filling bodies by 8 and the production costs by 5. There is therefore an optimum, minimum diameter for manufacturing filling bodies, below which it is not economically reasonable to descend, and it is only for diameters equal to or greater than this minimum diameter that it becomes economically conceivable, by means of tricks, to increase the exchange surface area of the filling bodies.

Known tricks for increasing the surface area of a spherical filling body, without modifying the apparent diameter thereof, have hitherto consisted in cutting out recesses, grooves or notches in its surface, as in Patents U.S. Pat. No. 1,944,726, German Patent DE-A-2,003,392, U.S. Pat. No. 2,525,261 or European Patent EP-A-0,118,720. However, these examples have never been realized since they have come up against production problems such as:

the impossibility of optimizing the thickness of the plastic shell because of the lack of radial symmetry, as described in Section 1 above compared with a smooth sphere;

the impossibility of blow-moulding the shapes claimed because of concealed parts and;

the impossibility of unmolding the shapes claimed because of the excessively high back-tapers of the inscribed hollow features.

BRIEF DESCRIPTION OF THE INVENTION

This is why the present invention intends to produce an accumulator-exchanger of the filling-body type, the rigid spherical shells of which, partially filled with a heat and/or cold storage agent having a high liquid-solid transformation latent heat, such as water, salt hydrates or paraffins, and with a compressible material for absorbing the variations in the volume of the storage agent during its phase change, include means for increasing the exchange surface area thereof, characterized in that the said means consist of raised features inscribed on the shells of the said filling bodies, which raised features all have an axis of symmetry passing through the center of gravity of their base and through the center of the filling body, in that the said bases of the raised features are all equal and identical and in that the said raised features are uniformly distributed over the entire surface of the shell.

According to a non-limiting embodiment of the invention, and as shown in FIGS. 5–11, the said raised features consist of cylinders of revolution, right prisms, regular pyramids, regular truncated pyramids, cones of revolution, truncated cones of revolution or spherical caps, and, in a general manner, any surface of revolution whose axis of symmetry passing through the center of symmetry of the base surface also passes through the center of the spherical filling body, the bases of which are identical and which are uniformly distributed over the surface of the shell.

It should be understood that the abovementioned characteristics pertaining to the present invention are essential and determinant for obtaining a high-quality accumulator-exchanger of the filler-body type using spherical filler bodies of optimal shell diameter and shell thickness, since such raised features make it possible to increase the surface area of the shell very much more significantly while at the same time optimizing the weight of plastic, because a spherical symmetry identical to that of a simple sphere is obtained.

3—Improvement in the convection coefficient which contributes to exchange between the shell of the filling bodies of the accumulator-exchanger and the heat-transfer fluid.

An accumulator-exchanger of the filling-body type is very generally of the "flooded" type, that is to say that the heat-transfer medium used for carrying out the heat exchange with the filling bodies is liquid (water, glycol solution or brine) and it fills all the spaces left free in the tank. When the filling bodies of the accumulator-exchanger are spherical, the spaces left free between the spheres are very considerable since they represent approximately 40% of the total volume of the storage tank and, since the speed of flow of the heat-transfer medium between the spheres is correspondingly very-small, the flow regime is laminar and the convection coefficient, between the heat-transfer fluid and the shells, is a minimum. Increasing the convection coefficient therefore requires arrangements such that the speed of the heat-transfer medium is increased and/or its flow regime is disturbed so that the regime, previously laminar, becomes turbulent.

One solution, which consists in placing "baffles" inside the tank in order to increase the speed of the heat-transfer medium, is known but experiments have already proved that this technique leads to excessive production costs and very difficult implementation.

Consequently, the present invention proposes to produce an accumulator-exchanger of the filling-body type as described above, but the raised features of which are in addition distributed in a staggered fashion so that the heat-transfer medium surrounding the sphere is forced, whatever the position of the sphere in the storage tank, to "slalom"

around the raised features. The path followed by the heat-transfer medium is thus longer and its greater speed combined with the loss and with the regaining of dynamic pressure necessary for the changes of direction which are imposed on it by the raised features have the effect of modifying the flow regime which, becoming turbulent, has the effect of increasing the convention coefficient.

It should be understood that this characteristic peculiar to the present invention is essential and determinant for obtaining a high-quality accumulator-exchanger of the filling-body type based on spherical filling bodies of optimal shell thickness and diameter, since the raised features provided for by the invention on the surface of the filling bodies, compared to the hollow features of the filling bodies according to the prior art (in particular foriegn patent WO-A-94 09331, French Patent FR-A-2,609,536 and European Patent EP-A-0,073,836), are the only ones to enable the flow regime to be disturbed sufficiently so as to modify the nature thereof and thus to increase the convection coefficient. This is because, in the case of the hollow features of the prior art, a certain amount of heattransfer fluid (glycol solution, brine or air) lies in the hollows of the surface of the filling bodies where it stagnates, while most of the fluid flows above these hollows or depressions without penetrating into them, thereby impairing heat exchange because of the reduction in the convection coefficient. On the other hand, when according to the invention the surface of the filling bodies is provided with raised features, the heat-transfer fluid cannot ignore them since it flows around the spherical bodies by permanently striking these raised features.

Thus, the present invention also proposes to produce an accumulator-exchanger of the filling-body type as described above, but which furthermore is not of the "flooded" type in the sense that the tank which contains the filling bodies and which has an identical cross-section over its entire height is empty of liquid heat-transfer medium. The liquid heat-transfer medium (water, glycol solution or brine), sprayed in the top part of the tank and flowing under gravity onto and between the filling bodies has a much higher speed, which results in a correspondingly more turbulent flow regime and a correspondingly higher convention coefficient. It will be understood that this objective cannot be achieved with accumulator-exchangers of the "flooded" filling-body type since their "flexibility", "elasticity" or "deformability", which is claimed in the patents mentioned in the preamble of the present description and which is required in order to absorb, partly or completely, variations in volume arising from the changes in phase of the storage agent, would not be able, without being damaged, to absorb these variations should they at the same time have to support, apart from the liquid heat-transfer medium which surrounds them, not only their own weight but also the weight of the filling bodies in the upper layers.

On the other hand, it will be understood that the spherical filling-body shells consisting of raised features according to the invention and as specified hereinabove behave with respect to external and internal stresses in the same way as an alveolate structure and that, in this way, their mechanical resistance to internal and external stresses is greatly superior to the mechanical strength of a simple spherical shell of the same thickness.

As a consequence, this invention also relates to an accumulator-exchanger characterized in that it consists of a vertical tank housing a plurality of filling bodies as defined hereinabove and presenting an identical cross-section over its entire height and in that the heat-transfer fluid (water, glycol solution or brine) is delivered into the said tank by means of a spray boom placed at the top of the said tank so that the heat-transfer fluid, which flows under gravity onto and between the filling bodies, carries out heat exchange by cascading onto the said bodies and by "slaloming" between the latter and their raised features, a minimum level of heat-transfer medium being maintained in the bottom of the said tank.

According to another aspect of the present invention, the latter also relates to a heat and/or cold accumulator-exchanger characterized in that it consists of a vessel of the tank or box type, housing a plurality of filling bodies as defined hereinabove and presenting to the flow of the heat-transfer medium a cross-section which is identical either over its entire height or over its entire width and in that the heat-transfer fluid is air which is forced into the said vessel using a fan placed upstream of the latter.

Here too, it may be seen how the filling bodies described above, with their raised features, are determinant for obtaining a high-quality accumulator-exchanger since the air forced between the filling bodies strikes the raised features on their surfaces so as to create violent turbulence which reduces the boundary layer and increases the convective exchange. In the same way as previously, it will be understood that, from a mechanical standpoint, this objective cannot be achieved with accumulator-exchangers of the type having filling bodies flooded in a liquid heat-transfer medium since their "flexibility", "elasticity" or "deformability", which is described and claimed in the aforementioned prior art and which is necessary in order to absorb, completely or partly, the variations in volume resulting from the changes in phase of the storage agent, would not be able, without being damaged, to absorb these variations should they at the same time have to support, apart from the liquid heat-transfer medium which surrounds them, not only their own weight but also that of the filling bodies in the upper layers.

On the other hand, it will be understood that the spherical filling-body shells consisting of raised features according to the present invention behave with respect to the external and internal stresses in the same way as an alveolate structure and that, in this way, their mechanical resistance to internal and external stresses is greatly superior to the mechanical strength of a simple spherical shell of the same thickness.

In addition, air, which in the present invention can be used as the heat-transfer medium both during charging of the store and during removal therefrom, is advantageously used in the course of removal from a cold store since, the wet-bulb temperature of the air to be cooled always being greater than the storage temperature, the water contained in the air condenses on the filling bodies, correspondingly increasing the convective exchange coefficient.

4—Optimization of the thermal conductivity coefficient of the filling-body shell of the accumulator-exchanger.

It is known from Patent U.S. Pat. No. 4,205,656 that the thermal conductivity coefficient of the plastic filling bodies may be improved by the use of specific additives or "compounds"; the optimization of this coefficient will therefore consists in using the "compounds" which have the best thermal conductivity coefficient without losing the mechanical properties of the base material, for a minimum and well-controlled additional cost.

Although this arrangement can be employed within the scope of the present invention, it does not, however, form part of the latter.

Other characteristics and advantages of the present invention will emerge from the description given below with reference to the appended drawings which illustrate an embodiment thereof which is devoid of any limiting character. In the drawings:

DETAILED DESCRIPTION OF THE INVENTION

Figure 1:
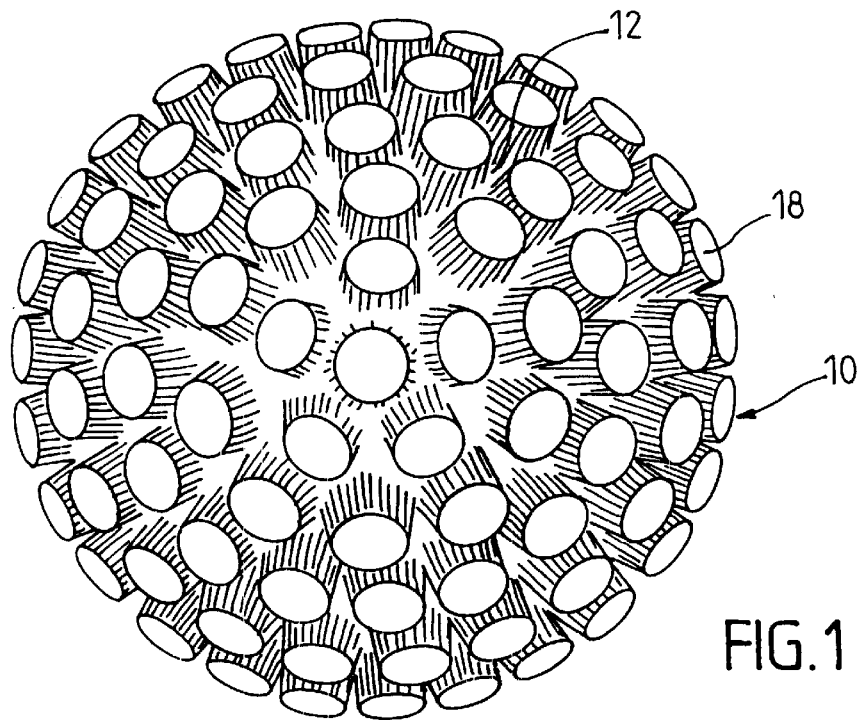
FIG. 1 is a perspective view of an illustrative embodiment of a filling body according to the present invention.
Figure 2:
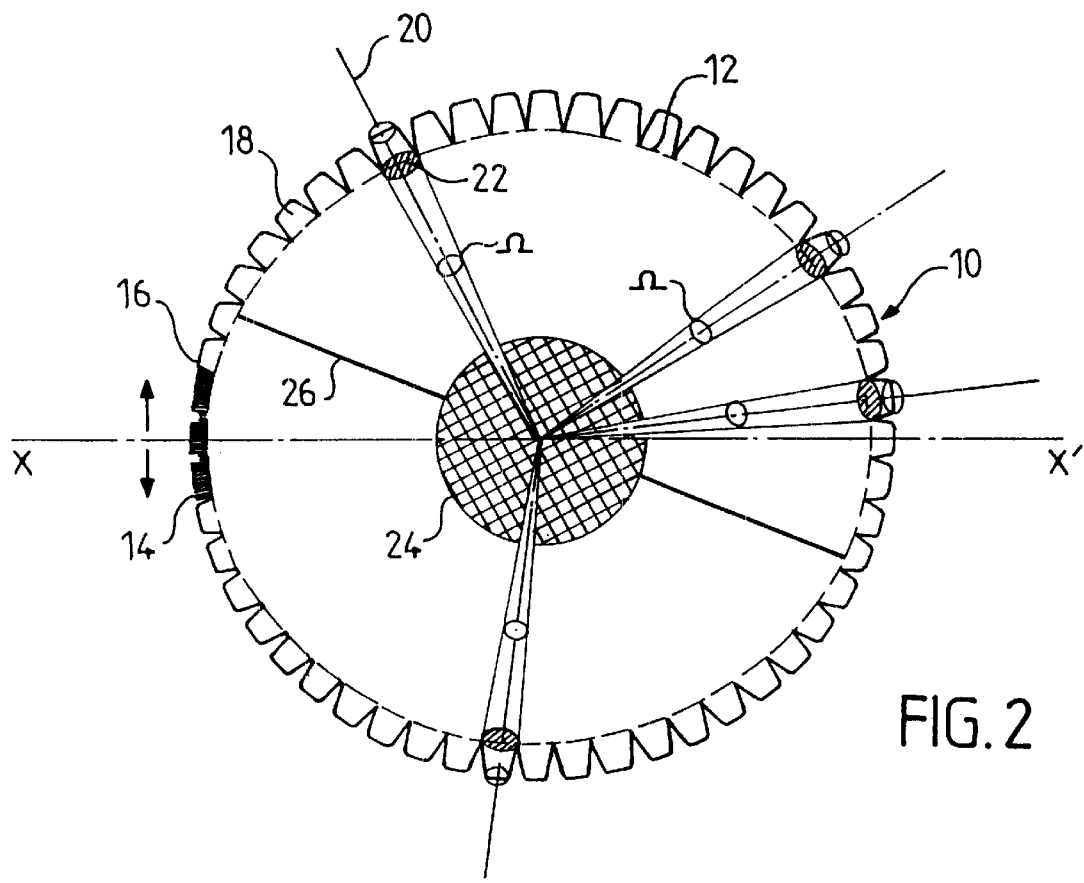
FIG. 2 is diametral cross-sectional view of the filling body illustrated in FIG. 1.

Referring to FIGS. 1 and 2, it may be seen that each filling body 10 employed in a heat and/or cold accumulator-exchanger according to the present invention has a shell 12 whose surface is covered with a plurality of raised features 18 which, in this non-limiting illustrative embodiment, consist of truncated cones. These are arranged in a staggered fashion and uniformly distributed over the entire surface of the shell 12 of each filling body 10 so as to force the heat-transfer medium to "slalom" around these cones as will be seen hereinbelow.

Each filling body 10 is made from a material, preferably a plastic, having a good thermal conductivity coefficient and it has a rigid thin-walled shell 12 whose thickness is constant over its entire surface. In its peripheral region, this shell has an opening 16, preferably of circular shape, which is hermetically sealed by a cap 14, after partially filling the internal volume of the body 10 with the change-of-phase material and after inserting a flexible and compressible expansion body 24, centered on the center 0 of the shell-sphere 12, using a rod 26 or equivalent, in order to absorb the variations in the volume of the storage agent during its phase change.

As specified hereinabove, the shell 12 has on its surface a multitude of raised features 18, consisting here of truncated cones of revolution, the axes of symmetry 20 of which all pass through the center 0 of the filling body 10 and whose bases 22 are all identical and of equal surface area. These raised features 18 are uniformly distributed over the shell 12 and arranged in a staggered fashion, as already mentioned hereinabove and as may be clearly seen in FIG. 1.

The solid angles $\Omega$, subtended at the center 0 of the shell 12 by the surfaces of the bases 22 of the raised features 18, are all equal and uniformly distributed over the shell 12.

The height of the truncated cones of revolution 18 decrease uniformly from the top of the filling body 10 down to the plane of symmetry X–X' which constitutes the plane of unmolding of the filling body, so as to limit the back-taper to approximately 3% of the diameter of the body and thus enable the latter to be unmolded, after extrusion and blow moulding, in accordance with the manufacturing constraints mentioned in the preamble of the present description. In general, the raised features 18 have relative dimensions such that the total exchange surface area which results therefrom is at least equal to twice the surface area of a smooth sphere having the same apparent diameter, thereby making it possible, according to the invention, to reduce the number of bodies to be manufactured in a ratio of 8 to 1 and the manufacturing costs in a ratio of 5 to 1.

Production quality will be greater, all other qualities being equal, the greater the increase in surface area generated by the raised impressions 18.

Figure 3:
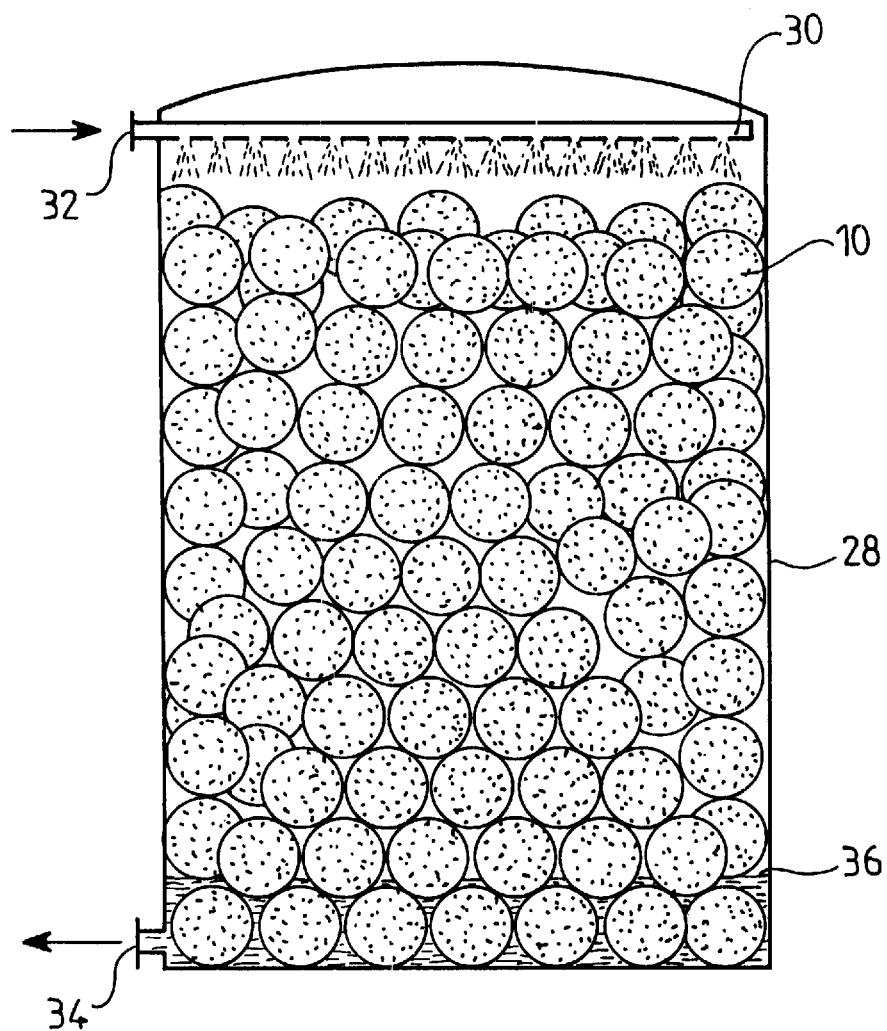
FIG. 3 is a diagrammatic vertical axial cross-sectional view of an illustrative embodiment of an accumulator-exchanger according to the present invention.

FIG. 3 shows diagrammatically a heat and/or cold accumulator-exchanger employing filling bodies such as those described above with reference to FIGS. 1 and 2.

In this illustrative embodiment, devoid of any limiting character, this exchanger is in the form of a vertical tank 28 which has an identical cross-section over its entire height. As may be seen in FIG. 3, this tank 28 is of cylindrical shape in this non-limiting illustrative embodiment. In its upper part, it has a boom 30 for spraying the liquid heat-transfer medium, this boom being supplied from a pipe 32. This tank is not of the "flooded" type given that it is not full of liquid heat-transfer medium, the latter, sprayed in the top part of the tank by means of the boom 30, flowing under gravity onto and between the filling bodies 10 which it contains. Thus, the heat-transfer medium carries out heat exchange with the filling bodies 10 by "cascading" under gravity onto and "slaloming" between the latter and the raised features with which the filling bodies according to the invention are provided, thereby considerably improving the heat exchange as explained hereinabove. According to the invention, a minimum level 36 of the heat-exchange medium is maintained in the bottom of the tank so as to compensate for the inertia of this heat-transfer medium flowing under gravity and thus avoid unpriming the pump for circulating the said heat-transfer medium. After heat exchange with the filling bodies 10, the heat-transfer medium is removed from the tank 28 to the utilization circuit via a pipe 34.

Figure 4:
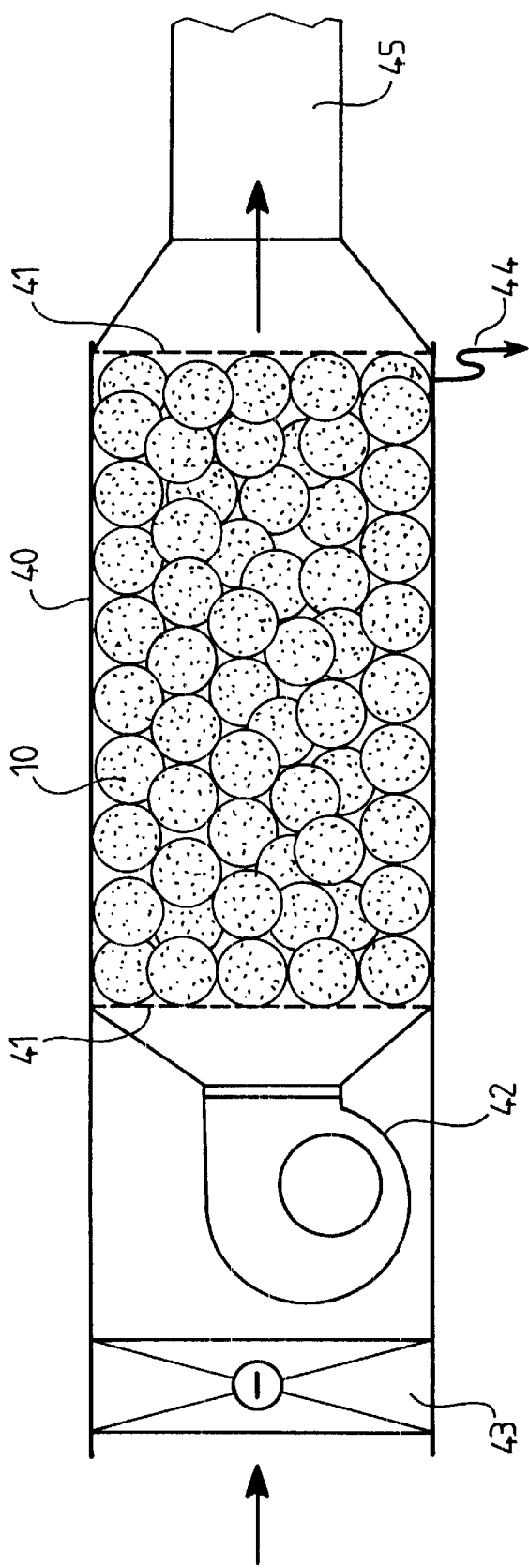
FIG. 4 is a diagrammatic vertical cross-sectional view of another illustrative embodiment of an accumulator-exchanger according to the present invention.
Figure 5:
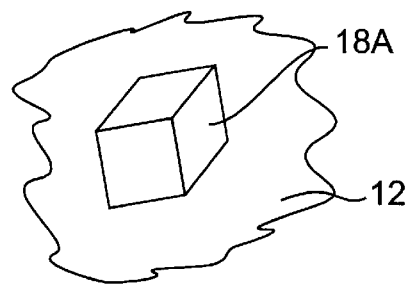
FIG. 5 is a perspective view of a raised feature having the configuration of a right prism.
Figure 6:
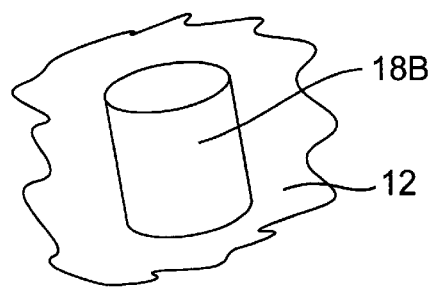
FIG. 6 is a perspective view of a raised feature having the configuration of a cylinder.
Figure 7:
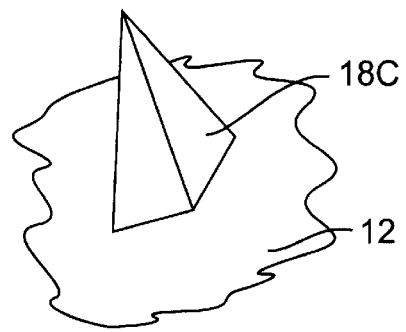
FIG. 7 is a perspective view of a raised feature having the configuration of a pyramid.
Figure 8:
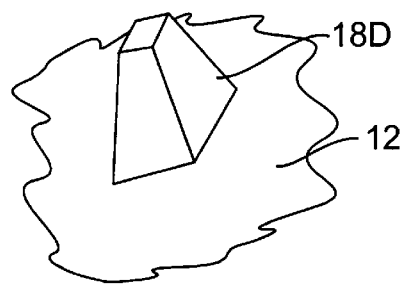
FIG. 8 is a perspective view of a raised feature having the configuration of a truncated pyramid.
Figure 9:
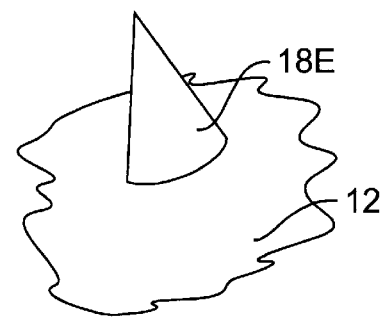
FIG. 9 is a perspective view of a raised feature having the configuration of a cone.
Figure 10:
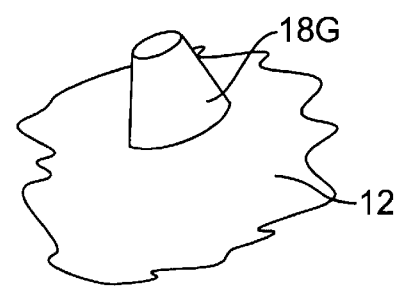
FIG. 10 is a perspective view of a raised feature having the configuration of a truncated cone, corresponding to those shown in FIG. 1.
Figure 11:
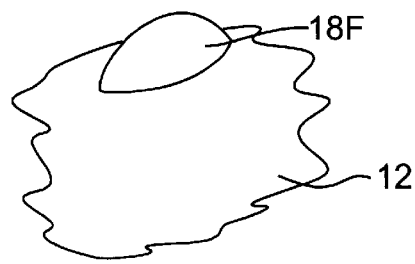
FIG. 11 is a perspective view of a raised feature having the configuration of a spherical cap.

Reference is now made to FIG. 4 which illustrates non-limitingly another embodiment of a heat and/or cold accumulator-exchanger using filling bodies such as those described hereinabove with reference to FIGS. 1 and 2.

In this illustrative embodiment, this accumulator-exchanger is in the form of a parallel-epipedal box 40 having an identical cross-section over its entire length. As may be seen in this FIG. 4, this box is provided, at each of the ends of the compartment containing the spherical filling bodies 10 according to the invention, with an openwork wall 41 (made, for example, in the form of a grille, a mesh, a perforated metal plate or any equivalent means). These openwork walls 41 enable the filling bodies 10 to be contained inside the compartment of the accumulator-exchanger provided for this purpose while letting the air blown by a fan 42 to pass freely through it. This box 40 is not of the flooded type, given that it is free of any liquid heat-transfer media (water, glycol solution or brine), the heat-transfer medium used in this illustrative embodiment being air blown through the accumulator-exchanger by the fan 42.

Assuming that the exchanger described above is a cold accumulator-exchanger, the phase of charging the store and the phase of removal from the store are carried out in the following manner:

during the phase of charging the store, air, cooled through a cooling battery 43 supplied by a refrigerating unit (not shown), is sucked by the fan 42 and then blown through the storage box; the cold air is heated on coming into contact with the filling bodies 10, transferring the refrigerating energy to them. The air thus heated is sent again upstream of the cooling battery 43, via a duct 45, and a new cycle starts again;

during the phase of removal from the store, the refrigerating unit which supplies the cooling battery 43 not being in operation, the (hot and wet) air to be cooled is sucked in by the fan 42 and blown, by this fan, through the box 40 containing the filling bodies 10. The hot air, in contact with the cold filling bodies transfers its heat energy to them and, having done this, the air reaches its wet-bulb temperature and then condenses on the filling bodies, correspondingly improving the convection coefficient. The condensation water is removed by a syphon 44 provided in the lower part of the box 40, as may be seem in FIG. 4. The air thus cooled is made available to the system to be supplied via the ventilation duct 45.

Of course, it still remains the case that the present invention is not limited to the illustrative embodiments described and/or represented here, but it encompasses all variants thereof.

We claim:

1. An accumulator-exchanger of a filling-body type, rigid spherical shells of which, partially filled with a heat and/or cold storage agent having a high liquid-solid transformation latent heat, and with a compressible material for absorbing the variations in the volume of the storage agent during its phase change, and comprising: raised features for increasing an exchange surface area thereof and all having an axis of symmetry passing through the center of symmetry of their base and through the center of the filling body, said bases of the raised features being all equal and identical and said raised features being uniformly distributed over the entire surface of the shell.

2. Accumulator-exchanger according to claim 1, wherein said raised features inscribed on the shells of the filling bodies are distributed in a staggered fashion.

3. Accumulator-exchanger according to claim 1, wherein said raised features inscribed on the shells of the filling bodies have surfaces of revolution.

4. Accumulator-exchanger according to claim 1, wherein said raised features inscribed on the shells of the filling bodies are volumes whose bases are regular polygons.

5. Accumulator-exchanger according to claim 3, wherein said raised features further comprise cylinders, right prisms, regular pyramids, regular truncated pyramids, cones, truncated cones or spherical caps.

6. Accumulator-exchanger according to claim 1, wherein the height of said raised features decreases uniformly from the top of the filling body down to a plane of symmetry which is an unmolding plane of said filling body.

7. Accumulator-exchanger according to claim 1, wherein said raised features have relative dimensions such that a total exchange surface area resulting therefrom is at least equal to twice the surface area of a smooth sphere having the same apparent diameter.

8. Accumulator-exchanger according to claim 1, further comprising a vertical tank housing a plurality of filling bodies and presenting an identical cross-section over its entire height wherein liquid heat-transfer fluid is delivered into said tank by means of a spray boom placed at the top of said tank so that the liquid heat-transfer fluid, which flows under gravity onto and between the filling bodies, carries out heat exchange by cascading onto said bodies and furthermore by "slaloming" between the bodies and their raised features, a minimum level of the heat-transfer liquid being maintained in the bottom of said tank.

9. Accumulator-exchanger according to claim 1, further comprising a vessel of a cylindrical-tank or parallelepipedal box type housing a plurality of said filling bodies and presenting a cross-section which is identical over its entire length and wherein air is forced onto said vessel by means of a fan placed in an inlet of said vessel so that the air sucked up by the fan and blown onto and between said filling bodies carries out thermal heat exchange by cascading onto said bodies and by "slaloming" between the bodies and their raised features, openwork walls being provided in said vessel in order to contain therein said filling bodies, while letting the air blown through a storage device to pass through freely, an outlet for condensates being provided in the lower part of said vessel.

10. Accumulator-exchanger according to claim 1, wherein said raised features comprise cylinders.

11. Accumulator-exchanger according to claim 1, wherein said raised features comprise right prisms.

12. Accumulator-exchanger according to claim 1, wherein said raised features comprise regular pyramids.

13. Accumulator-exchanger according to claim 1, wherein s aid raised features comprise regular truncated pyramids.

14. Accumulator-exchanger according to claim 1, wherein said raised features comprise cones.

15. Accumulator-exchanger according to claim 1, wherein said raised features comprise truncated cones.

16. Accumulator-exchanger according to claim 1, wherein said raised features comprise spherical caps.

* * * * *